(12) United States Patent
Lee et al.

(10) Patent No.: US 8,160,641 B2
(45) Date of Patent: Apr. 17, 2012

(54) PORTABLE ELECTRONIC DEVICE

(75) Inventors: Shen-Yuan Lee, Taipei (TW);
Chien-Ming Hung, Taipei (TW);
Wen-Huei Su, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 756 days.

(21) Appl. No.: 12/349,434

(22) Filed: Jan. 6, 2009

(65) Prior Publication Data
US 2009/0186667 A1 Jul. 23, 2009

(30) Foreign Application Priority Data
Jan. 22, 2008 (TW) ............................... 97102335 A

(51) Int. Cl.
*H04M 1/00* (2006.01)

(52) U.S. Cl. ............... 455/556.1; 455/550.1; 455/575.1

(58) Field of Classification Search ........... 455/550.1, 455/556.1, 575.1; 381/345, 386; 361/814
See application file for complete search history.

(56) References Cited

U.S. PATENT DOCUMENTS

| | | | | |
|---|---|---|---|---|
| 5,682,290 | A * | 10/1997 | Markow et al. | 361/679.55 |
| 5,841,857 | A * | 11/1998 | Zoiss et al. | 379/433.04 |
| 6,352,434 | B1 * | 3/2002 | Emmert | 439/65 |
| 6,527,610 | B1 * | 3/2003 | Hornsby et al. | 446/175 |
| 6,834,181 | B2 * | 12/2004 | Kaikuranta et al. | 455/90.3 |
| 6,980,828 | B2 * | 12/2005 | Nousiainen | 455/556.1 |
| 7,680,521 | B2 * | 3/2010 | Kim et al. | 455/575.4 |
| 7,860,356 | B2 * | 12/2010 | Van Montfort et al. | 385/14 |
| 7,894,850 | B2 * | 2/2011 | Chen | 455/550.1 |
| 7,953,461 | B2 * | 5/2011 | Fukazawa | 455/575.1 |
| 7,991,147 | B2 * | 8/2011 | Emmert | 379/433.01 |
| 2003/0095680 | A1 * | 5/2003 | Kim et al. | 381/409 |
| 2004/0142731 | A1 * | 7/2004 | Ho et al. | 455/569.1 |
| 2004/0204055 | A1 * | 10/2004 | Nousiainen | 455/556.1 |
| 2005/0059425 | A1 * | 3/2005 | Wang et al. | 455/550.1 |
| 2005/0128322 | A1 * | 6/2005 | Eaton et al. | 348/239 |
| 2005/0140811 | A1 | 6/2005 | Yoo et al. | |
| 2005/0253957 | A1 | 11/2005 | Gustavsson et al. | |
| 2006/0067557 | A1 * | 3/2006 | Imamura | 381/388 |
| 2007/0014507 | A1 * | 1/2007 | Van Montfort et al. | 385/14 |
| 2007/0070189 | A1 * | 3/2007 | Lee | 348/14.16 |
| 2007/0097248 | A1 | 5/2007 | Yoo et al. | |
| 2007/0099656 | A1 | 5/2007 | Yoo et al. | |
| 2007/0178949 | A1 * | 8/2007 | Sato et al. | 455/575.3 |
| 2007/0291534 | A1 * | 12/2007 | Maatta | 365/174 |
| 2007/0298827 | A1 * | 12/2007 | Hansson | 455/550.1 |
| 2010/0110283 | A1 * | 5/2010 | Shin | 348/374 |
| 2010/0113087 | A1 * | 5/2010 | Demuynck et al. | 455/550.1 |
| 2010/0189297 | A1 * | 7/2010 | Ranta et al. | 381/345 |
| 2010/0220887 | A1 * | 9/2010 | Welker et al. | 381/386 |

* cited by examiner

*Primary Examiner* — Lewis West

(57) ABSTRACT

A portable electronic device is provided. The portable electronic device comprises a housing, a printed circuit board, an amplifier and a lens module. The housing comprises a loudspeaker division and a continuous wall. The continuous wall surrounds and defines the loudspeaker division, wherein the continuous wall comprises a notch. The printed circuit board comprises a loudspeaker area and a lens module connector, wherein the loudspeaker area corresponds to the loudspeaker division, and the lens module connector is disposed in the loudspeaker area.

20 Claims, 3 Drawing Sheets

PORTABLE ELECTRONIC DEVICE

CROSS REFERENCE TO RELATED APPLICATIONS

This Application claims priority of Taiwan Patent Application No. 097102335, filed on Jan. 22, 2008, the entirety of which is incorporated by reference herein.

BACKGROUND OF THE INVENTION

1. Field of the Invention

The present invention relates to a portable electronic device, and in particular relates to a portable electronic device with improved arrangement of elements on a printed circuit board.

2. Description of the Related Art

FIG. 1 shows a conventional portable electronic device 1, comprising a loudspeaker 10, a printed circuit board 20 and a lens module 30. The lens module 30 comprises a lens 31, a circuit board 32 and a flexible circuit board 33. The lens 31 is disposed on the circuit board 39. The flexible circuit board 33 is connected to the circuit board 32. A lens module connector 21 is disposed on the printed circuit board 20. The flexible circuit board 33 is connected to the lens module connector 21.

Conventionally, a large unused area is required on the printed circuit board 20 where the printed circuit board 20 contacts the loudspeaker 10, to keep the loudspeaker 10 airtight to maintain amplifying effect. If a tall electronic element, such as a Global Positioning System (GSM) connector, is disposed on the unused area of the printed circuit board 20, a through hole is required to be formed through the loudspeaker 10 to receive the tall electronic element, thus decreasing amplifying effect thereof. Additionally, an antenna is conventionally required to be disposed corresponding to the loudspeaker 10, and electronic elements which may generate noise are conventionally required to be disposed outside of the unused area. Therefore, decreasing actual usable space of the printed circuit board.

BRIEF SUMMARY OF THE INVENTION

A detailed description is given in the following embodiments with reference to the accompanying drawings.

A portable electronic device is provided. The portable electronic device comprises a housing, a printed circuit board, an amplifier and a lens module. The housing comprises a loudspeaker division and a continuous wall, and the continuous wall surrounds and defines the loudspeaker division, wherein the continuous wall comprises a notch. The printed circuit board comprises a loudspeaker area and a lens module connector, wherein the loudspeaker area corresponds to the loudspeaker division, and the lens module connector is disposed in the loudspeaker area. The amplifier is located in the loudspeaker division. The lens module comprises a lens, a circuit board and a flexible printed circuit board. The lens is disposed on the circuit board, and the circuit board extends into the loudspeaker division through the notch. The flexible printed circuit board is connected to the circuit board, wherein the flexible printed circuit board extends into the loudspeaker division and is connected to the lens module connector.

Utilizing the embodiment of the invention, the lens module connector is disposed in the loudspeaker area. Therefore, more printed circuit board available space is allowed for disposing other electronic elements, particularly electronic elements with larger heights, such as a Global Positioning System (GSM) connector. The space of the printed circuit board is utilized more efficiently, and arrangement of the electronic elements thereon is more flexible. The lens module connector generates low electromagnetic waves, which does not deteriorate signal transmission of an antenna.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
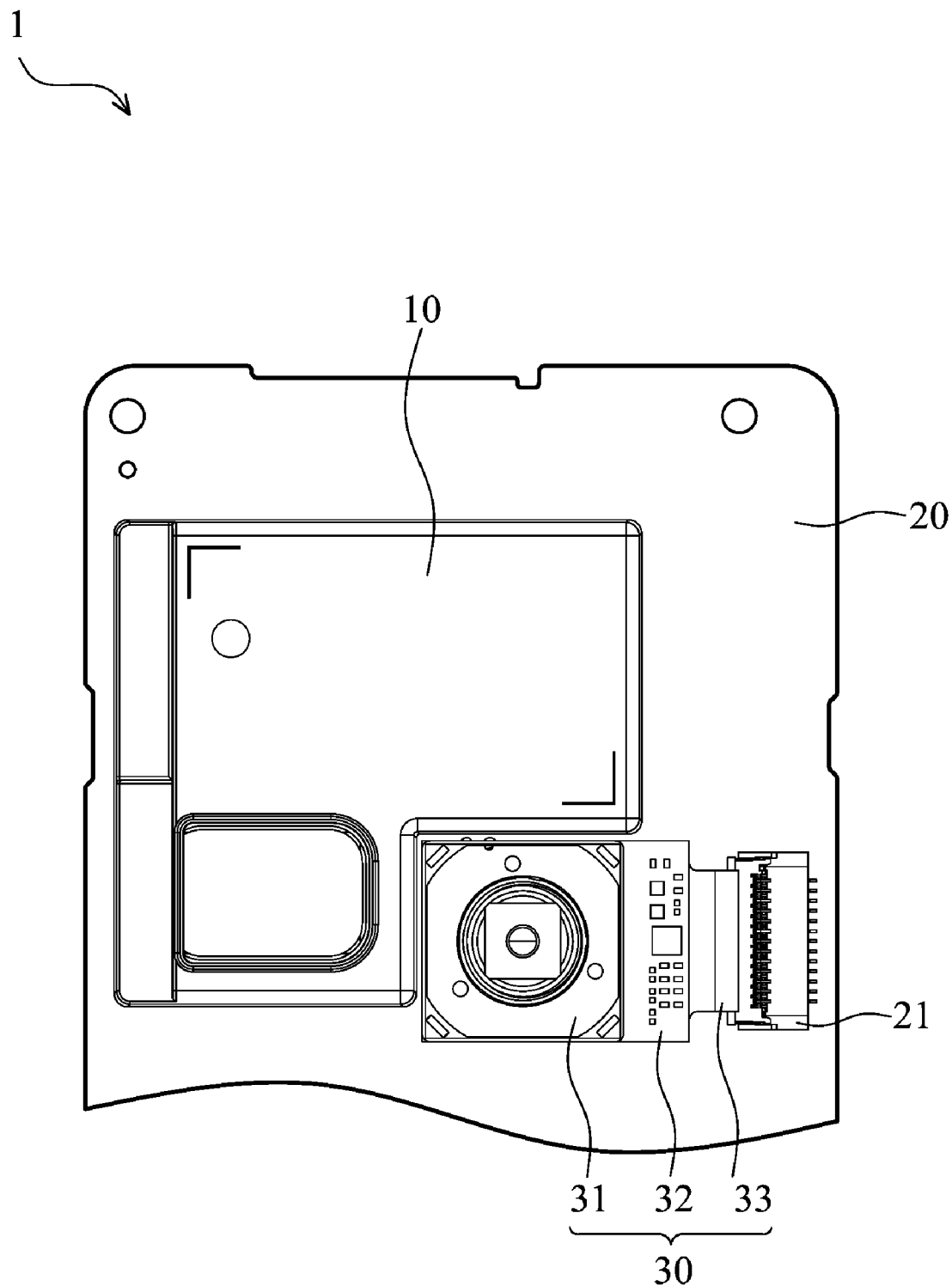
FIG. 1 shows a conventional portable electronic device.
Figure 2A:
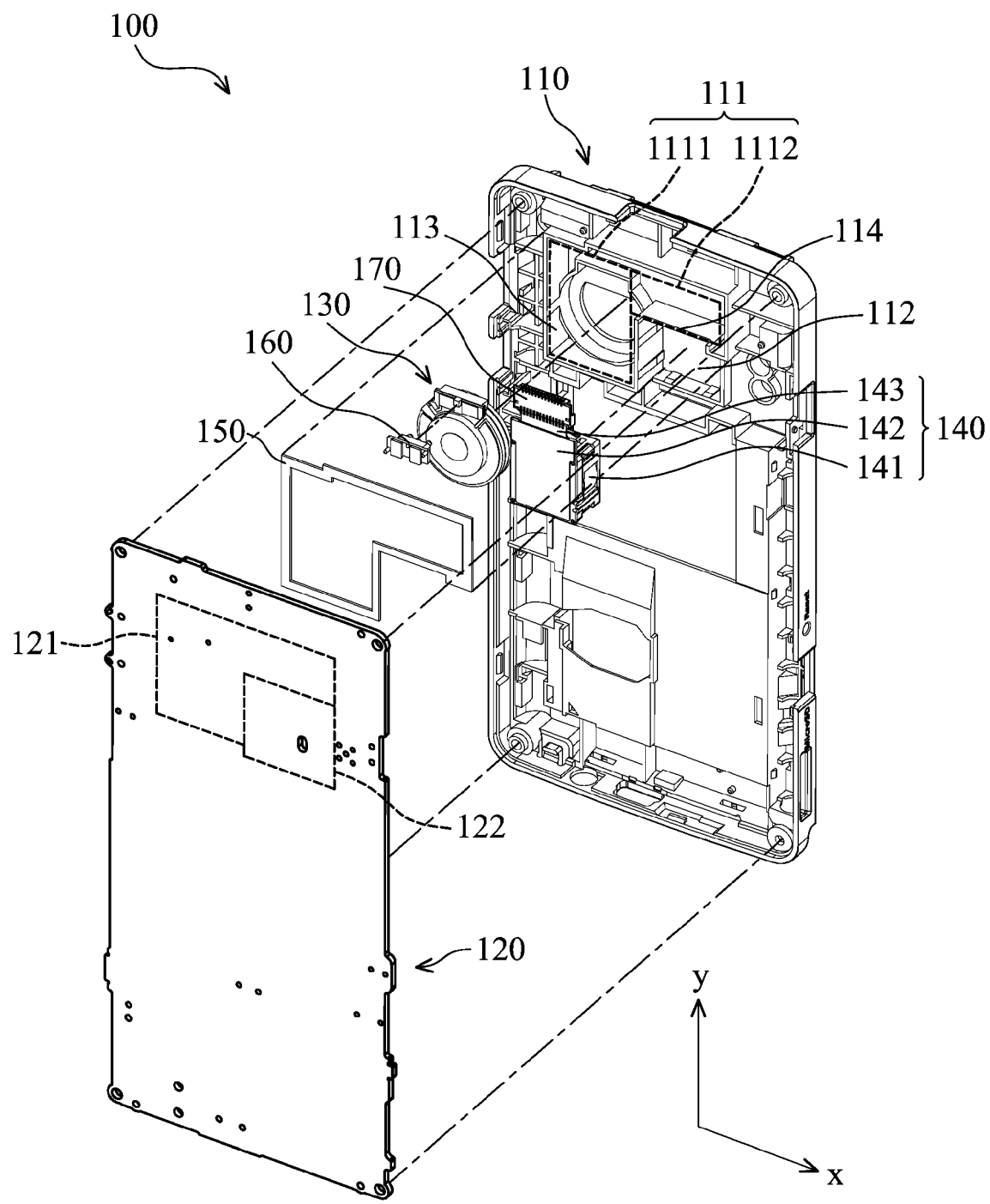
FIG. 2a is an exploded view of a portable electronic device of an embodiment of the invention.
Figure 2B:
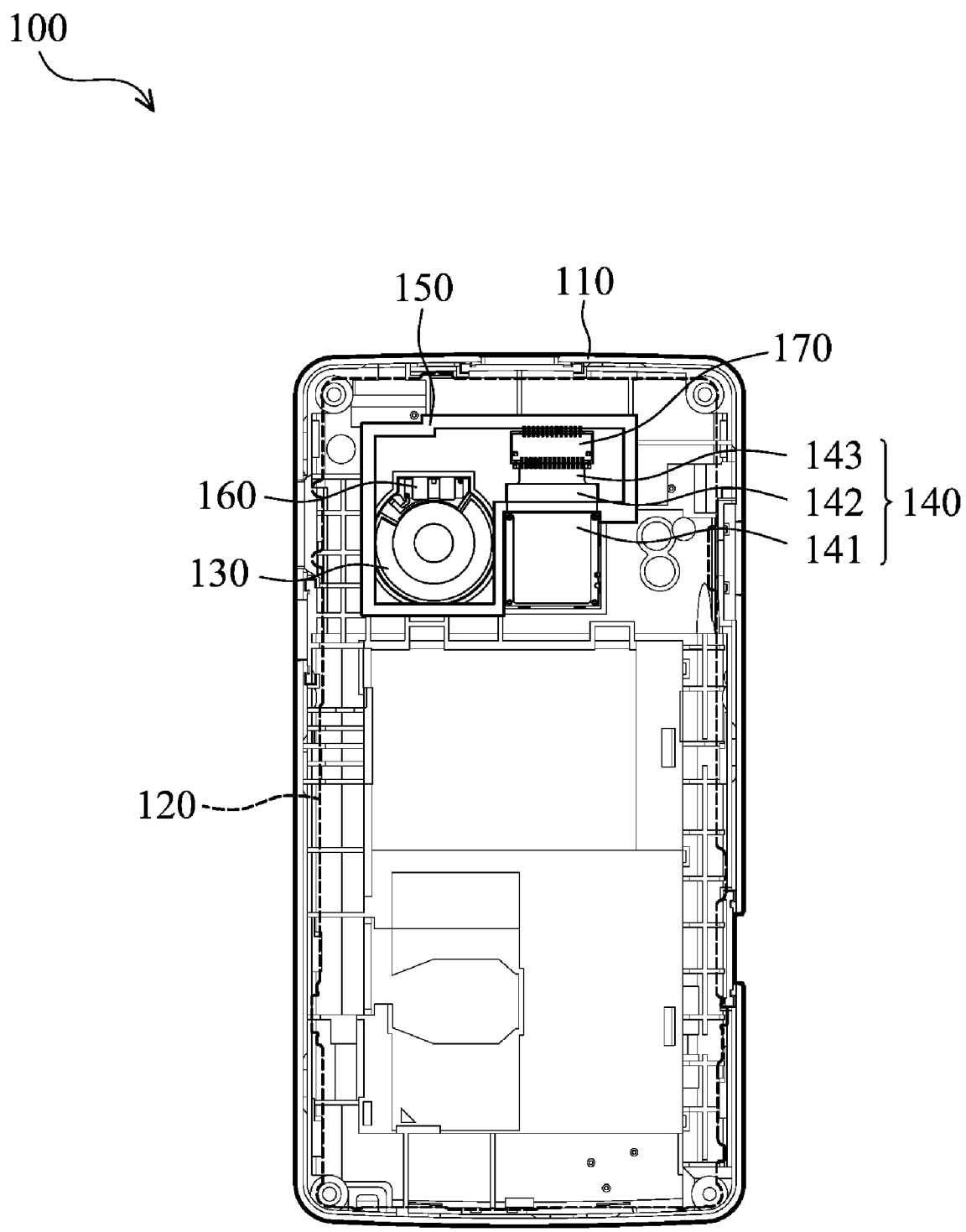
FIG. 2b is a front view of the portable electronic device of the embodiment of the invention.

FIG. 2a is an exploded view of a portable electronic device of an embodiment of the invention. FIG. 2b is a front view of the portable electronic device of the embodiment of the invention. With reference to FIGS. 2a and 2b, the portable electronic device 100 comprises a housing 110, a printed circuit board, 120, an amplifier 130, a lens module 140, a sponge material 150, a pogo pin connector 160 and a lens module connector 170.

The housing 110 comprises a loudspeaker division 111, a lens holding division 112 and a continuous wall 113. The continuous wall 113 surrounds and defines the loudspeaker division 111. The loudspeaker division 111 is close to the lens holding division 112. The continuous wall 113 comprises a notch 114.

The printed circuit board 120 comprises a loudspeaker area 121 and a lens holding area 122. The loudspeaker area 121 corresponds to the loudspeaker division 111, the lens holding area 122 corresponds to the lens holding division 112, and the lens module connector 170 is disposed in the loudspeaker area 121.

The amplifier 130 is disposed in the loudspeaker division 111. The pogo pin connector 160 electrically connects the amplifier 130 to the printed circuit board 120.

The lens module 140 is disposed in the lens holding division 112. The lens module 140 comprises a lens 141, a circuit board 142 and a flexible circuit board 143. The lens 141 is disposed on the circuit board 142. The circuit board 142 extends from the lens holding division 112 into the loudspeaker division 111 through the notch 114. The flexible printed circuit board 143 connects to the circuit board 142 and the lens module connector 170, and extends into the loudspeaker division 111.

The sponge material 150 is sandwiched between the continuous wall 113 and the printed circuit board 120. The continuous wall 113 is a baffler wall.

To tightly contact the notch 114 with the circuit board 142, the shape of the notch 114 matches the shape of the circuit board 142. The sponge material 150 presses against the continuous wall 113 and the circuit board 142 to keep the loudspeaker division 111 airtight to maintain amplifying effect.

The pogo pin connector 160 is electrically connected to the amplifier 130.

The loudspeaker division 111 is L shaped, comprising a first section 1111 and a second section 1112. The first section 1111 extends in a first direction y (parallel to a major axis of the portable electronic device). The second, section 1112 extends in a second direction x (parallel to a minor axis of the portable electronic device). The first direction y is perpendicular to the second direction x. The amplifier 130 is located in the first section 1111. The lens module connector 170 is located in the second section 1112. The flexible circuit board 142 extends in a direction parallel to the major axis of the portable electronic device.

In the embodiment of the invention, the portable electronic device 100 can be a mobile phone, a personal digital assistant or other portable electronic devices. The printed circuit board 120 can further comprise a GSM (Global Positioning System) connector.

Utilizing the embodiment of the invention, the lens module connector 170 is disposed in the loudspeaker area 121. Therefore, more printed circuit board available space of is allowed for disposing other electronic elements, particularly electronic elements with larger heights, such as a Global Positioning System (GSM) connector. The space of the printed circuit board is utilized more efficiently, and arrangement of the electronic elements thereon is more flexible. The lens module connector 170 generates low electromagnetic waves, which does not deteriorate signal transmission of an antenna.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable electronic device, comprising:
   a housing, comprising a loudspeaker division, a lens holding division and a continuous wall, wherein the continuous wall surrounds the loudspeaker division, the loudspeaker division is close to the lens holding division, and the continuous wall comprises a notch; and
   a printed circuit board, comprising a loudspeaker area, a lens holding area and a lens module connector, wherein the loudspeaker area corresponds to the loudspeaker division, the lens holding area corresponds to the lens holding division, and the lens module connector is disposed in the loudspeaker area.

2. The portable electronic device as claimed in claim 1, further comprising a lens module, disposed in the lens holding division, comprising:
   a lens;
   a circuit board, wherein the lens is disposed on the circuit board, and the circuit board extends from the lens holding division into the loudspeaker division through the notch; and
   a flexible printed circuit board, connected to the circuit board, wherein the flexible printed circuit board extends from the loudspeaker division and is connected to the lens module connector.

3. The portable electronic device as claimed in claim 1, further comprising a sponge material sandwiched between the continuous wall and the printed circuit board.

4. The portable electronic device as claimed in claim 1, further comprising a GPS connector disposed on the printed circuit board.

5. The portable electronic device as claimed in claim 1, wherein the loudspeaker division is L shaped.

6. The portable electronic device as claimed in claim 1, wherein the loudspeaker division comprises a first section and a second section, the first section extends in a first direction, the second section extends in a second direction, and the first direction is perpendicular to the second direction.

7. The portable electronic device as claimed in claim 6, further comprising an amplifier, wherein the amplifier is located in the first section and the lens module connector is located in the second section.

8. The portable electronic device as claimed in claim 1, wherein the flexible circuit board extends in a direction parallel to a major axis of the portable electronic device.

9. The portable electronic device as claimed in claim 1, wherein the continuous wall is a baffler wall.

10. The portable electronic device as claimed in claim 1, wherein the portable electronic device is a mobile phone.

11. A portable electronic device, comprising:
    a housing, comprising a loudspeaker division and a continuous wall, wherein the continuous wall surrounds the loudspeaker division, and the continuous wall comprises a notch; and
    a printed circuit board, comprising a loudspeaker area and a lens module connector, wherein the loudspeaker area corresponds to the loudspeaker division, and the lens module connector is disposed in the loudspeaker area.

12. The portable electronic device as claimed in claim 11, further comprising a lens module comprising:
    a lens;
    a circuit board, wherein the lens is disposed on the circuit board and, the circuit board extends into the loudspeaker division through the notch; and
    a flexible printed circuit board, connected to the circuit board, wherein the flexible printed circuit board extends into the loudspeaker division and is connected to the lens module connector.

13. The portable electronic device as claimed in claim 11, further comprising a sponge material sandwiched between the continuous wall and the printed circuit board.

14. The portable electronic device as claimed in claim 11, further comprising a GPS connector disposed on the printed circuit board.

15. The portable electronic device as claimed in claim 11, wherein the loudspeaker division is L shaped.

16. The portable electronic device as claimed in claim 11, wherein the loudspeaker division comprises a first section and a second section, the first section extends in a first direction, the second section extends in a second direction, and the first direction is perpendicular to the second direction.

17. The portable electronic device as claimed in claim 16, further comprising an amplifier, wherein the amplifier is located in the first section and the lens module connector is located in the second section.

18. The portable electronic device as claimed in claim 11, wherein the flexible circuit board extends in a direction parallel to a major axis of the portable electronic device.

19. The portable electronic device as claimed in claim 11, wherein the continuous wall is a baffler wall.

20. The portable electronic device as claimed in claim 11, wherein the portable electronic device is a mobile phone.

* * * * *